US010484838B2

(12) United States Patent
Kim et al.

(10) Patent No.: US 10,484,838 B2
(45) Date of Patent: Nov. 19, 2019

(54) GROUP COMMUNICATION METHOD AND DEVICE FOR PROVIDING PROXIMITY SERVICE

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 14/767,872

(22) PCT Filed: Feb. 28, 2014

(86) PCT No.: PCT/KR2014/001675
§ 371 (c)(1),
(2) Date: Aug. 13, 2015

(87) PCT Pub. No.: WO2014/133356
PCT Pub. Date: Sep. 4, 2014

(65) Prior Publication Data
US 2015/0382159 A1 Dec. 31, 2015

Related U.S. Application Data

(60) Provisional application No. 61/770,332, filed on Feb. 28, 2013, provisional application No. 61/911,471, (Continued)

(51) Int. Cl.
*H04W 4/08* (2009.01)
*H04W 4/80* (2018.01)
(Continued)

(52) U.S. Cl.
CPC ............... *H04W 4/08* (2013.01); *H04W 4/80* (2018.02); *H04W 76/40* (2018.02); *H04W 8/005* (2013.01);
(Continued)

(58) Field of Classification Search
CPC ..... H04W 4/008; H04W 4/08; H04W 76/002; H04W 76/023; H04W 88/04;
(Continued)

(56) References Cited

U.S. PATENT DOCUMENTS

2008/0043658 A1* 2/2008 Worrall ............... H04W 72/005
370/312
2008/0247373 A1* 10/2008 Synnergren ........... H04L 12/189
370/340
(Continued)

FOREIGN PATENT DOCUMENTS

CN 102859925 A 1/2013
JP 2002-164843 A 6/2002
(Continued)

OTHER PUBLICATIONS

3GPP TR 22.803 V2.0.0 (Nov. 2012); 3rd Generation Partnership Project; Technical Specification Group SA; Feasibility Study for Proximity Services (ProSe) ; (Release 12).*
(Continued)

*Primary Examiner* — Jamaal Henson
(74) *Attorney, Agent, or Firm* — Birch, Stewart, Kolasch & Birch, LLP

(57) ABSTRACT

The present invention relates to a method and a device for performing group communication based on a proximity service (ProSe) in a wireless communication system. More specifically, the method comprises the steps of: enabling a relay terminal (relay user equipment, relay UE, ProSe UE-to-Network relay) to register group communication in a (Continued)

network node; and enabling the relay terminal to perform the group communication with the network node, wherein the group communication is configured to transmit a downlink signal using a multimedia broadcast and multimedia service (MBMS) if the number of terminals, except for a relayed terminal (relayed user equipment, relayed UE) among a plurality of terminals registered in the network node, is not less than a reference value.

12 Claims, 5 Drawing Sheets

Related U.S. Application Data filed on Dec. 4, 2013, provisional application No. 61/912,553, filed on Dec. 6, 2013, provisional application No. 61/923,237, filed on Jan. 3, 2014.

(51) Int. Cl.
*H04W 76/40* (2018.01)
*H04W 88/04* (2009.01)
*H04W 76/14* (2018.01)
*H04W 8/00* (2009.01)
*H04W 8/18* (2009.01)

(52) U.S. Cl.
CPC ............ *H04W 8/186* (2013.01); *H04W 76/14* (2018.02); *H04W 88/04* (2013.01)

(58) Field of Classification Search
CPC ....... H04W 4/023; H04W 4/06; H04W 8/005; H04W 8/186; A61K 2039/505; A61K 39/00; C07K 16/30; G01N 33/574; G06F 3/048; C12Q 1/6886
USPC ........................................................ 370/312
See application file for complete search history.

(56) References Cited

U.S. PATENT DOCUMENTS

| | | | |
|---|---|---|---|
| 2009/0180417 A1* | 7/2009 | Frost | H04W 72/005 370/312 |
| 2010/0265867 A1* | 10/2010 | Becker | H04W 72/005 370/312 |
| 2011/0258313 A1* | 10/2011 | Mallik | H04W 8/005 709/224 |
| 2011/0268101 A1* | 11/2011 | Wang | H04L 5/0053 370/344 |
| 2012/0083283 A1* | 4/2012 | Phan | H04W 72/048 455/450 |
| 2013/0128756 A1* | 5/2013 | Zhang | H04W 4/06 370/252 |
| 2014/0003319 A1* | 1/2014 | Etemad | H04W 28/08 370/312 |
| 2014/0003320 A1* | 1/2014 | Etemad | H04W 4/06 370/312 |
| 2014/0177506 A1* | 6/2014 | Korus | H04W 4/06 370/312 |
| 2015/0223028 A1* | 8/2015 | Wang | H04W 4/70 370/312 |

FOREIGN PATENT DOCUMENTS

| | | |
|---|---|---|
| JP | 2010-541434 A | 12/2010 |
| JP | 2011-223622 A | 11/2011 |
| KR | 10-2011-0103852 A | 9/2011 |

OTHER PUBLICATIONS

3GPP TR 22.803 V2.0.0 (Nov. 2012); 3rd Generation Partnership Project; Technical Specification Group SA; Feasability Study for Proximity Services (ProSe) (Release 12) (Year: 2012).*
"3rd Generation Partnership Project; Technical Specification Group SA; Feasibility Study for Proximity Services (ProSe) (Release 12)", 3GPP TR 22.803, V2.0.0, Nov. 2012, 1-39 pgs.

* cited by examiner (a)

(b)

GROUP COMMUNICATION METHOD AND DEVICE FOR PROVIDING PROXIMITY SERVICE

CROSS REFERENCE TO RELATED APPLICATIONS

This application is the National Phase of PCT International Application No. PCT/KR2014/001675, filed on Feb. 28, 2014, which claims priority under 35 U.S.C. 119(e) to U.S. Provisional Application Nos. 61/770,332, 61/911,471, 61/912,553 and 61/923,237 filed on Feb. 28, 2013, Dec. 4, 2013, Dec. 6, 2013 and Jan. 3, 2014 respectively, all of which are hereby expressly incorporated by reference into the present application.

TECHNICAL FIELD

The present invention relates to a wireless communication system and, more particularly, to a group communication method and apparatus for providing proximity services (ProSe).

BACKGROUND ART

Proximity service (ProSe) refers to a scheme for supporting communication between devices located physically close to each other. Specifically, ProSe is aimed to discover an application operating devices which are in proximity and, ultimately, to support exchange of data related to the application. For example, it may be considered that ProSe is applied to applications such as social network services (SNS), commerce, and games.

ProSe may be also called device-to-device (D2D) communication. That is, ProSe refers to a communication scheme for establishing a direct link between a plurality of devices (e.g., user equipments (UEs)) and thus directly exchanging user data (e.g., audio, multimedia data, etc.) between the devices without going via a network. ProSe communication may include UE-to-UE communication, Peer-to-Peer communication, etc. In addition, ProSe communication may be applied to Machine-to-Machine (M2M) communication, Machine Type Communication (MTC), etc. Accordingly, ProSe is considered as one solution to reduce the burden of a base station due to rapidly increasing data traffic. Besides, by adopting ProSe, effects such as reduction in procedures of a base station, reduction in power consumption of devices which participate in ProSe, increase in data transmission speed, increase in network capacity, load distribution, cell coverage expansion, etc. can be expected.

DISCLOSURE

Technical Problem

While adoption of ProSe is demanded as described above, a mechanism for supporting and controlling ProSe is not specifically prepared.

An object of the present invention devised to solve the problem lies in a method for performing group communication including UE-to-network relay operation in relation to a ProSe-based group communication mechanism.

It is to be understood that both the foregoing general description and the following detailed description of the present invention are exemplary and explanatory and are intended to provide further explanation of the invention as claimed.

Technical Solution

The object of the present invention can be achieved by providing a method for performing group communication based on proximity services (ProSe) in a wireless communication system, the method including performing group communication registration in a network node by a relay user equipment (UE) (or a ProSe UE-to-network relay), and performing group communication with the network node by the relay UE, wherein the group communication is configured to transmit a downlink signal using a multimedia broadcast and multimedia service (MBMS) scheme if a number of UEs other than relayed UEs among the UEs registered in the network node is equal to or greater than a reference value.

The method may further include receiving a first message for group registration of the network node, from a relayed UE by the relay UE, and transmitting a second message for group registration of the relayed UE to the network node.

The second message may include location information of the relay UE. The location information may include at least one of a tracking area identity (TAI) and an E-UTRAN cell global identifier (ECGI). The second message may include relay operation information, and the relay operation information may indicate at least one of whether the relay UE performs relay operation for the relayed UE, whether group registration of the relayed UE is performed via the relay UE, whether the relayed UE participates in group communication via the relay UE, whether the relayed UE is located in network coverage, whether the relayed UE is located in E-UTRAN coverage supporting group communication, and whether the relayed UE is located in a group communication service range. The second message may include identification information of the relay UE.

The method may further include receiving MBMS service information from the network node. The MBMS service information may be configured to be transmitted only to at least one relay UE among the at least one relay UE and at least one relayed UE located in a service range of the group communication. The MBMS service information may include at least one of a service identifier (ID), a temporary mobile group identity (TMGI), and a multicast address of media.

Granularity for a service range of the group communication may be one of a single cell, a group communication service area, an MBMS service area, a single tracking area, multiple tracking areas, multiple cells, a Multimedia Broadcast multicast service Single Frequency Network (MBSFN) area, an area pre-specified for group communication, and a Public Land Mobile Network (PLMN).

In another aspect of the present invention, provided herein is a method for supporting group communication based on proximity services (ProSe) by a network node in a wireless communication system, the method including registering at least one user equipment (UE) in a specific group for receiving data from the network node, and determining a group communication scheme for a plurality of UEs registered in the specific group, wherein the group communication scheme is determined as a multimedia broadcast and multimedia service (MBMS) scheme if a number of the UEs other than relayed UEs satisfies a reference value.

The method may further include receiving user service description (USD) information for MBMS delivery from a Broadcast-Multicast Service Centre (BM-SC) by the network node. The network node may be configured to transmit MBMS information only to at least one relay UE among the at least one relay UE and at least one relayed UE located in a service range of the group communication. The USD information may be configured to be used to receive downlink media/traffic by a relay UE located in a service range of the group communication.

In another aspect of the present invention, provided herein is a relay user equipment (UE) (or a ProSe UE-to-network relay) for performing group communication based on proximity services (ProSe) in a wireless communication system, the relay UE including a radio frequency (RF) unit, and a processor, wherein the processor is configured to perform group communication registration in a network node, and to perform group communication with the network node, and wherein the group communication is configured to transmit a downlink signal using a multimedia broadcast and multimedia service (MBMS) scheme if a number of UEs other than relayed UEs among the UEs registered in the network node is equal to or greater than a reference value.

In another aspect of the present invention, provided herein is a network node for supporting group communication based on proximity services (ProSe) in a wireless communication system, the network node including a radio frequency (RF) unit, and a processor, wherein the group communication is configured to register at least one user equipment (UE) in a specific group for receiving data from the network node, and to determine a group communication scheme for the at least one UE registered in the specific group, and wherein the group communication scheme is determined as a multimedia broadcast and multimedia service (MBMS) scheme if a number of UEs other than relayed UEs among a plurality of UEs registered in the network node is equal to or greater than a reference value.

Advantageous Effects

According to the present invention, when ProSe-based group communication is performed, group communication including UE-to-network relay operation may be efficiently performed.

It will be appreciated by persons skilled in the art that the effects that could be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
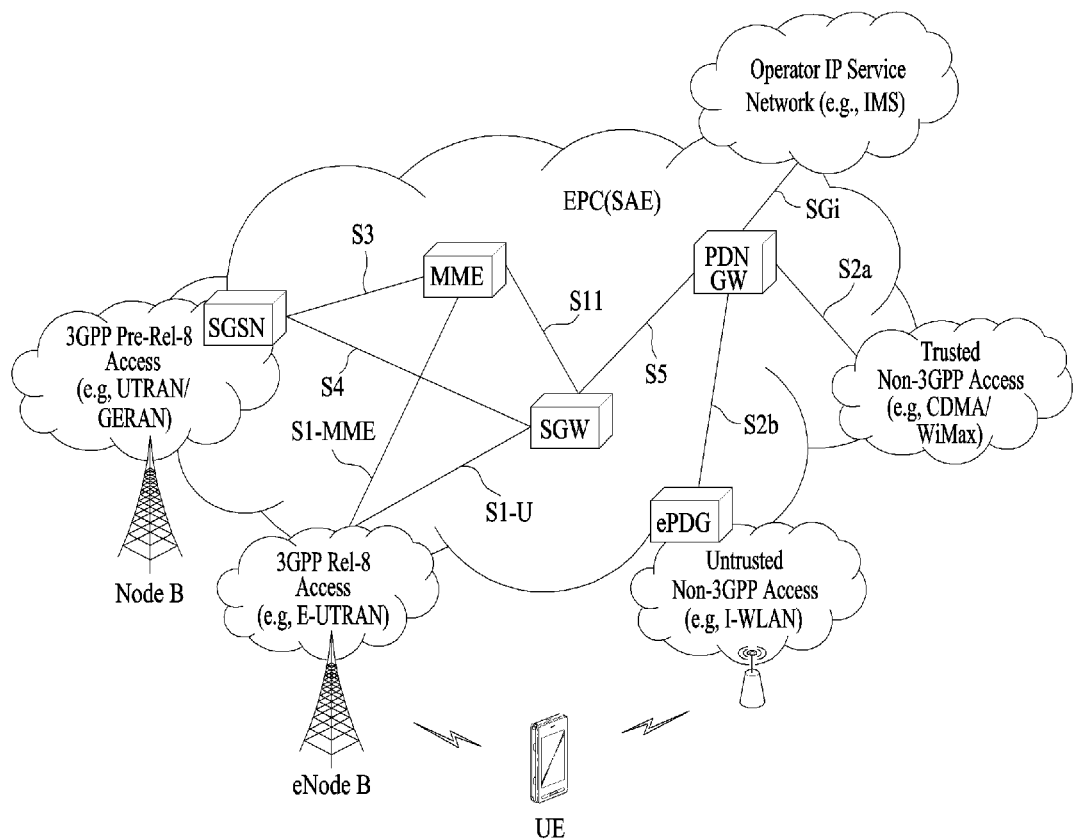
FIG. 1 is a view schematically illustrating the architecture of an Evolved Packet System (EPS) including an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, like reference numerals denote like elements in the drawings throughout the specification.

The embodiments of the present invention can be supported by technical standards disclosed for at least one of radio access systems such as Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2 systems. For steps or parts of which description is omitted to clarify the technical features of the present invention, reference may be made to these documents. Further, all terms as set forth herein can be explained by the technical standards.

The following technology can be used in various radio access systems. For clarity, the present disclosure focuses on 3GPP LTE and LTE-A systems. However, the technical features of the present invention are not limited thereto.

Terms used in the present specification are defined as follows.

UMTS (Universal Mobile Telecommunication System): A 3$^{rd}$ generation mobile communication technology based on Global System for Mobile communication (GSM), which is developed by 3GPP.

EPS (Evolved Packet System): A network system configured with an access network such as an Evolved Packet Core (EPC), which is an Internet Protocol (IP)-based packet switched core network, LTE or UMTS Terrestrial Radio Access Network (UTRAN). EPS is a network evolved from UMTS.

NodeB: A base station of a GSM/EDGE (Enhanced Data rates for GSM Evolution) Radio Access Network (GERAN)/UTRAN, which is installed outdoors and has a coverage corresponding to a macro cell.

eNodeB (evolved Node B): A base station of an LTE network, which is installed outdoors and has a coverage corresponding to a macro cell.

UE (User Equipment): A user device. The UE may be referred to as a terminal, mobile equipment (ME) or a mobile station (MS). In addition, the UE may be a portable device such as a laptop computer, a mobile phone, a personal digital assistant (PDA), a smartphone or a multimedia device, or a non-portable device such as a personal computer (PC) or a vehicle mounted device. The UE is capable of performing communication using a 3GPP spectrum such as LTE and/or a non-3GPP spectrum such as Wi-Fi or public safety.

ProSe (Proximity Services or Proximity-based Services): Services enabling discovery and direct communication/communication via a base station/communication via a third device between physically adjacent devices. In this case, user plane data is exchanged through a direct data path without going via a 3GPP core network (e.g., EPC).

Proximity: Proximity of a UE to another UE is determined based on whether a predetermined proximity condition is satisfied. Different proximity conditions can be given for ProSe discovery and ProSe communication. The proximity condition may be configured to be controlled by an operator.

ProSe Discovery: A process that identifies that a UE is in proximity of another UE, using Evolved Universal Terrestrial Radio Access (E-UTRA).

ProSe Communication: Communication between UEs in proximity by means of a data path established between the UEs. The data path can be established directly between the UEs or routed via a local base station(s) (e.g., eNodeB(s)).

ProSe-enabled UE: A UE that supports ProSe discovery and/or ProSe communication. The ProSe-enabled UE is simply referred to as a UE in the following description.

ProSe-enabled Network: A network that supports ProSe discovery and/or ProSe communication. The ProSe-enabled network is simply referred to as a network in the following description.

ProSe Group Communication: One-to-many ProSe communication between more than two ProSe-enabled UEs in proximity by means of a common communication path established between the ProSe-enabled UEs.

ProSe UE-to-Network Relay: A form of relay in which a public safety ProSe-enabled UE acts as a communication relay between a public safety ProSe-enabled UE and a ProSe-enabled network using E-UTRA.

ProSe UE-to-UE Relay: A form of relay in which a public safety ProSe-enabled UE acts as a ProSe communication relay between two other public safety ProSe-enabled UEs.

RAN (Radio Access Network): A unit including a NodeB, an eNodeB and a radio network controller (RNC) for controlling the NodeB and the eNodeB in a 3GPP network. The RAN is present between a UE and a core network and provides connection to the core network.

HLR (Home Location Register)/HSS (Home Subscriber Server): A database having subscriber information in a 3GPP network. HSS may perform functions such as configuration storage, identity management and user state storage.

RANAP (RAN Application Part): An interface between a RAN and a node (e.g., Mobility Management Entity (MME)/Serving GPRS (General Packet Radio Service) Supporting Node (SGSN)/Mobile Switching Center (MSC)) for controlling a core network.

PLMN (Public Land Mobile Network): A network configured to provide mobile communication services to individuals. PLMN can be configured on an operator basis.

NAS (Non-Access Stratum): A functional layer for signaling and exchanging traffic messages between a UE and a core network in a UMTS protocol stack. NAS supports mobility of the UE and supports a session management procedure for establishing and maintaining IP connection between a UE and a Packet Data Network GateWay (PDN GW).

HNB (Home NodeB): Customer Premises Equipment (CPE) for providing UTRAN coverage. For details thereof, reference can be made to 3GPP TS 25.467.

HeNodeB (Home eNodeB): CPE for providing Evolved-UTRAN (E-UTRAN) coverage. For details thereof, reference can be made to 3GPP TS 36.300.

CSG (Closed Subscriber Group): A group of subscribers who are permitted to access one or more CSG cells of a Public Land Mobile Network (PLMN) as members of a CSG of a H(e)NB.

LIPA (Local IP Access): Access for an IP capable UE connected via a H(e)NB to another IP capable entity in the same residential/enterprise IP network. LIPA traffic is expected to not traverse a mobile operator's network. A 3GPP Release-10 system provides access via a H(e)NB to resources of a local network (e.g., network located at the customer's home or enterprise).

SIPTO (Selected IP Traffic Offload): In a 3GPP Release-10 system, an operator selects a Packet data network GateWay (PGW) which is physically close to a UE in an EPC network and supports handover of user traffic.

PDN (Packet Data Network) Connection: A logical connection between a UE indicated by a single IP address (e.g., single IPv4 address and/or single IPv6 prefix) and a PDN indicated by an Access Point Name (APN).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3 GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing Proximity Services (ProSe)

The present invention proposes a control mechanism for supporting proximity services (ProSe) or D2D services in a mobile communication system such as 3GPP Evolved Packet System (EPS).

Due to increase in user demands related to social network service (SNS), etc., demands for detection/discovery between physically adjacent users/devices and special applications/services (e.g., proximity-based applications/services) have appeared. Even in a 3GPP mobile communication system, potential use cases and scenarios of ProSe and potential service requirements to provide such services are under discussion.

The potential use cases of ProSe may include commercial/social services, network offloading, public safety, integration of current infrastructure services (to assure consistency of the user experience including reachability and mobility). In addition, use cases and potential requirements for public safety in the case of absence of EUTRAN coverage (subject to regional regulations and operator policies, and limited to specific public-safety designated frequency bands and terminals) are under discussion.

In particular, the scope of discussion of ProSe by 3GPP assumes that proximity-based applications/services are provided via LTE or WLAN, and that discovery and communication are performed between devices under the control of an operator/network.

Figure 2:
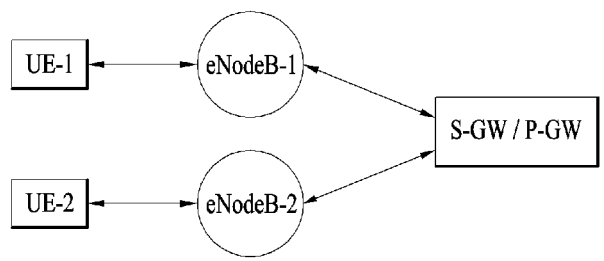
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case of no ProSe between UE-1 and UE-2. This default path goes via a base station (e.g., eNodeB or Home eNodeB) and gateway nodes (e.g., EPC or operator network). For example, as illustrated in FIG. 2, when UE-1 and UE-2 exchange data, data from UE-1 may be transmitted via eNodeB-1, S-GW/P-GW, and eNodeB-2 to UE-2 and, likewise, data from UE-2 may be transmitted via eNodeB-2, S-GW/P-GW, and eNodeB-1 to UE-1. Although UE-1 and UE-2 are camped on different eNodeBs in FIG. 2, UE-1 and UE-2 may be camped on the same eNodeB. In addition, although the two UEs are served by the same S-GW and P-GW in FIG. 2, various combinations of services are allowed here. For example, the UEs may be served by the same S-GW and different P-GWs, by different S-GWs and the same P-GW, or by different S-GWs and different P-GWs.

In the present invention, this default data path may be referred to as an infrastructure path, infrastructure data path or infrastructure communication path. In addition, communication through the infrastructure data path may be referred to as infrastructure communication.

Figure 3:
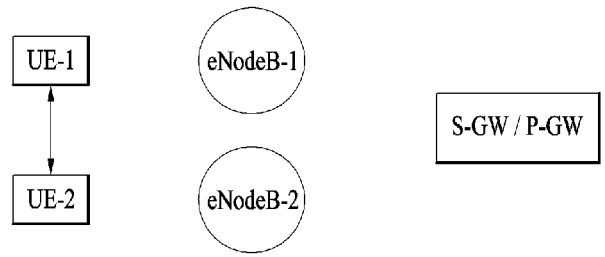
FIG. 3 is a view illustrating a direct mode data path between two UEs based on ProSe.
Figure 3:
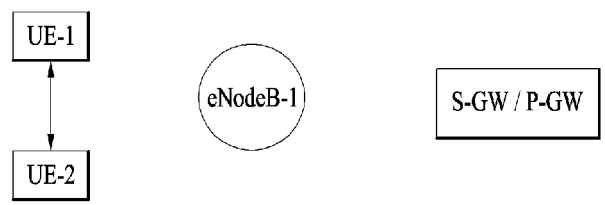

FIG. 3 is a view illustrating a direct mode data path between two UEs based on ProSe. This direct mode data path does not go via a base station (e.g., eNodeB or Home eNodeB) and gateway nodes (e.g., EPC).

FIG. 3(a) illustrates an exemplary case in which UE-1 and UE-2 are camped on different eNodeBs (e.g., eNodeB- and eNodeB-2) and exchange data through a direct mode data path. FIG. 3(b) illustrates an exemplary case in which UE-1 and UE-2 are camped on the same eNodeB (e.g., eNodeB-1) and exchange data through a direct mode data path.

It should be noted that a data path of a user plane is directly established between UEs without going via a base station or a gateway node as illustrated in FIG. 3, but a control plane path can be established via a base station and a core network. Control information exchanged through the control plane path may be information about session management, authentication, authorization, security, charging, etc. In the case of ProSe communication between UEs served by different eNodeBs as illustrated in FIG. 3(a), control information for UE-1 may be exchanged via eNodeB-1 with a control node (e.g., MME) of a core network, and control information for UE-2 may be exchanged via eNodeB-2 with a control node (e.g., MME) of a core network. In the case of ProSe communication between UEs served by the same eNodeB as illustrated in FIG. 3(b), control information for UE-1 and UE-2 may be exchanged via eNodeB-1 with a control node (e.g., MME) of a core network.

Figure 4:
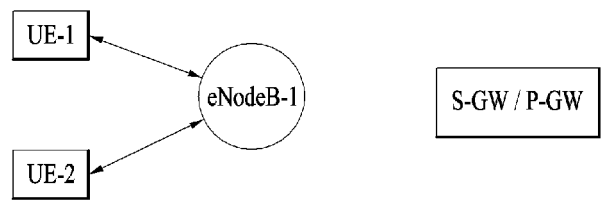
FIG. 4 is a view illustrating a locally routed data path between two UEs based on ProSe.

FIG. 4 is a view illustrating a locally routed data path between two UEs based on ProSe. As illustrated in FIG. 4, a ProSe communication data path between UE-1 and UE-2 is established via eNodeB-1 but does not go via a gateway node (e.g., EPC) operated by an operator. For a control plane path, if a locally routed data path is established between UEs served by the same eNodeB as illustrated in FIG. 4, control information for UE-1 and UE-2 may be exchanged via eNodeB-1 with a control node (e.g., MME) of a core network.

In the present invention, the data path described above in relation to FIGS. 3 and 4 may be referred to as a direct data path, data path for ProSe, ProSe-based data path or ProSe communication path. In addition, communication through this direct data path may be referred to as direct communication, ProSe communication or ProSe-based communication.

Figure 5:
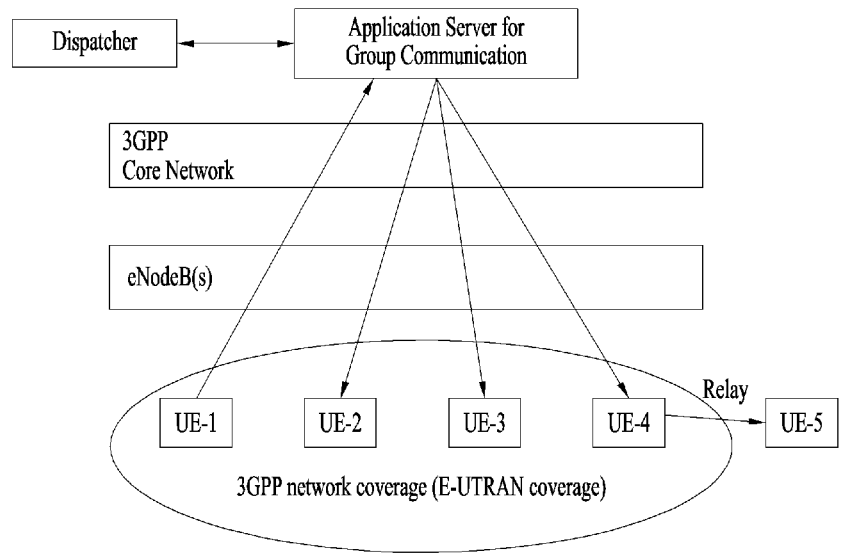
FIG. 5 is a view illustrating group communication including UE-to-network relay operation based on ProSe.

FIG. 5 illustrates an exemplary group communication scenario including UE-to-network relay operation. As illustrated in FIG. 5, UE-1, UE-2, UE-3, UE-4 and UE-5 are member UEs/users/subscribers belonging to the same group. An application server (AS) manages the group and group communication, and a dispatcher manages the group. Group communication (or a group call) is made similarly to push-to-talk (PTT), and an operation for joining the group should be preformed to participate in group communication.

In group communication of FIG. 5, one UE may be a talking party, i.e., a media (e.g., voice) transmitter, at a given point of time. Accordingly, a plurality of UEs may not simultaneously transmit media. UEs other than the UE serving as the talking party, which have joined the group for group communication, receive media transmitted from the talking party UE. Here, the UE may serve as the talking party after transmit permission is explicitly or implicitly received from the AS or the dispatcher.

Particularly, FIG. 5 illustrates that UE-5 receives group communication services not via the network but via UE-4. This shows a case in which a UE is located out of 3GPP network coverage (e.g., E-UTRAN coverage in the following description) or is located in E-UTRAN coverage that does not support group communication. In this case, the UE may receive group communication services through relay operation with a member UE belonging to the same group for receiving group communication services via the network. Accordingly, in the present invention, E-UTRAN coverage supporting group communication is called a group communication service range. Furthermore, reference can be made to 3GPP TS 22.468 and 3GPP TR 22.803 for details of service requirements related to group communication.

Figure 6:
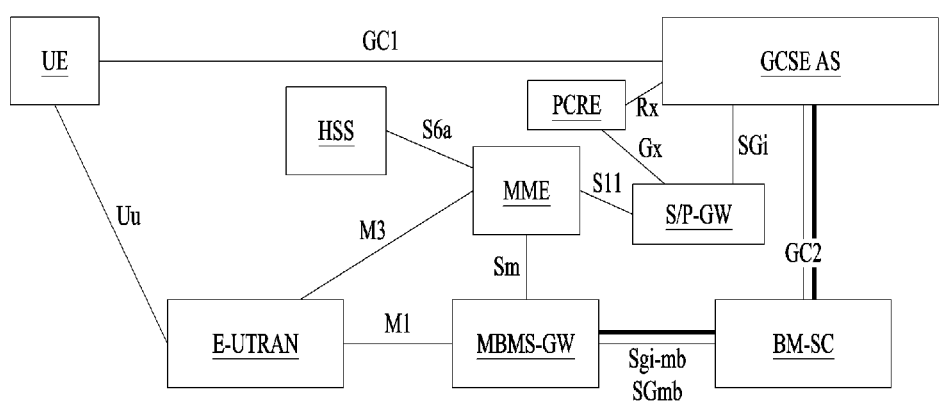
FIG. 6 is a view for describing group communication services.

FIG. 6 is a view for describing the architecture for group communication services. A description is now given of reference points illustrated in FIG. 6. A Broadcast-Multicast Service Centre (BM-SC) and an MBMS GW on a core network are used for multi-point service, and GC2 is used to request setup of the multi-point service. Here, GC2 consists of components of a user plane and a control plane. GC1 is used for signaling with a Group Communication Service Enabler (GCSE) AS for registering a UE in a GCSE group, relaying of eMBMS information, and service continuity.

Furthermore, in FIG. 6, the major function of the GCSE AS is to determine whether to deliver downlink media using a unicast scheme or a multicast (i.e., MBMS) scheme for i) a specific group communication or ii) a specific UE/receiving group member participating in group communication.

Additionally, uplink traffic is always delivered using a unicast scheme, and multi-point service is implemented using eMBMS. (For details thereof, reference can be made to 3GPP TS 23.246.)

Only potential use cases and requirements, and basic data paths and control paths of ProSe are under discussion as described above, but details of the architecture and operation of a 3GPP network for supporting ProSe have not been prepared. The present invention proposes specific examples of control plane signaling for enabling control of ProSe by an operator/network.

Proximity Services (ProSe)-Based Group Communication

The present invention proposes a mechanism for efficiently controlling proximity-based group communication in a mobile communication system such as 3GPP Evolved Packet System (EPS). The proximity-based group communication control mechanism proposed by the present invention may include a combination of one or more of 1) an operation for allowing a UE located out of a group communication service range (i.e., a relayed UE) to join a group for group communication services by a relay UE, 2) an operation for providing relay service to the relayed UE by the relay UE, 3) an operation for reselecting the relay UE, 4) an operation for utilizing a primary relay UE and a secondary relay UE by the relayed UE, and 5) an operation of a group communication AS. A detailed description is now given of operations 1) to 5) proposed by the present invention.

1. Operation for Allowing Relayed UE to Join Group by Relay UE

According to the present invention, the operation for allowing a UE located out of a group communication service range (hereinafter referred to as a relayed UE or UE-1) to join a group for group communication services may include a combination of one or more of operations described below.

1) A UE capable of relaying group communication, i.e., a UE capable of serving as a UE-to-network relay (hereinafter referred to as a relay UE or UE-2) may announce one or more identifier(s) included in a group for which the UE (i.e., the relay UE) can provide relay service. The identifier(s) transmitted from the relay UE as described above may be received by other UEs directly or via an eNodeB.

Furthermore, the above announcement may be performed simultaneously with an announcement of the presence of the relay UE (i.e., UE-2) in relation to proximity services, or performed separately therefrom in some cases. In addition, when the identifier(s) of the group for which relay service is providable are announced, the relay UE (i.e., UE-2) may already have joined the group(s). However, the relay UE may also announce the identifier(s) even before joining the group for which relay service is providable.

2) The relayed UE (i.e., UE-1) detects or discovers a UE capable of relaying group communication of a group to which the relayed UE belongs (hereinafter referred to as Group#1) (directly or via network), and then joins the UE capable of serving as a relay (i.e., UE-2). Furthermore, for convenience of explanation, the operation for joining the UE capable of serving as a relay (i.e., UE-2) may be understood as an operation for joining a group for which the relayed UE desires to receive relay service (i.e., Group#1) throughout the present invention.

As such, the relayed UE (i.e., UE-1) transmits a join request message to the UE capable of serving as a relay (i.e., UE-2). If the relayed UE (i.e., UE-1) has detected/discovered a plurality of UEs capable of serving as a relay, a relay UE may be selected based on various criteria. For example, the relay UE (i.e., UE-2) may be selected based on i) information about a group(s) for which the relay UE can provide relay service, ii) signal intensity, iii) preference, and iv) configuration/policy.

Specifically, for example, it is assumed that UE-A may relay group communication of Group#1 and Group#2, and UE-B may relay group communication of Group#1. On this assumption, when both UE-A and UE-B satisfy other conditions for selecting a relay, if a relayed UE desires to participate in group communications of Group#1 and Group#2, UE-A may be selected as a relay UE.

In addition, the join request message transmitted from UE-1 to UE-2 may include various information items required for group communication. For example, the join request message may include identification information of the relayed UE (i.e., UE-1I), identification information of a group to join, and security information.

Subsequent operations may be performed as described below based on whether the relay UE (i.e., UE-2) joins group communication (i.e., Group#).

3-a) Case in which the relay UE (i.e., UE-2) having received the join request message from the relayed UE (i.e., UE-1) has already joined Group#1:

3-a-1) It may be assumed that the relayed UE (i.e., UE-1) does not need to be explicitly allowed to join the group (e.g., network/group communication system/AS/dispatcher). If information indicating that relay operation should be performed needs to be signaled to the group (e.g., network/group communication system/AS/dispatcher) or permission needs to be received from the group in relation to the relay operation, the relay UE (i.e., UE-2) performs an operation for transmitting a message including relay operation information to the group (i.e., Group#1). After that, the relay UE transmits a response message to the join request message to the relayed UE.

Otherwise, if the information indicating that the relay operation should be performed does not need to be signaled to the group (i.e., Group#) (e.g., network/group communication system/AS/dispatcher) or permission does not need to be received from the group in relation to the relay operation, the relay UE transmits the response message to the join request message to the relayed UE (without transmitting the message including the relay operation information to the group).

3-a-2) Alternatively, if the relayed UE (i.e., UE-1) should be explicitly allowed to join or should explicitly join the group, and if the information indicating that the relay operation should be performed needs to be signaled to the group (e.g., network/group communication system/AS/dispatcher) or permission needs to be received from the group in relation to the relay operation, the relay UE performs an operation for allowing the relayed UE (i.e., UE-1) to join the group/an operation for transmitting a message including relay operation information. The above 2 operations may be performed simultaneously, in combination, or separately. After that, the relay UE transmits the response message to the join request message to the relayed UE.

Otherwise, if the information indicating that the relay operation should be performed does not need to be signaled to the group (e.g., network/group communication system/AS/dispatcher) or permission does not need to be received from the group in relation to the relay operation, the relay UE performs an operation for allowing the relayed UE (i.e., UE-1) to join the group. After that, the relay UE transmits the response message to the join request message to the relayed UE.

As described above, when the UE for providing relay service (i.e., UE-2) transmits a message for allowing the relayed UE (i.e., UE-1) to join the group, the UE for providing relay service (i.e., UE-2) may additionally or optionally include location information (e.g., tracking area identity (TAI) and/or E-UTRAN cell global identifier (ECGI)) thereof in the message for allowing the relayed UE (i.e., UE-1) to join the group. Furthermore, the above description may be applied throughout the present invention.

In addition, in 3-a-1) and 3-a-2), the relay operation information may include one or more information items described below, and may be explicit or implicit information. Furthermore, the relay operation information may always be transmitted to the network (or group communication system/group communication AS/dispatcher) in 3-a-2). In other words, the message for allowing the relayed UE to join the group may include the relay operation information. The above description may be applied throughout the present invention.

Information indicating that the UE for providing relay service (i.e., UE-2) performs relay operation for the relayed UE (i.e., UE-1)

Information indicating that the UE for joining the group (i.e., UE-1) joins the group via the relay UE (i.e., UE-2)

Information indicating that the UE for joining the group (i.e., UE-1) joins/participates in group communication via the relay UE (i.e., UE-2)

Information indicating that the UE for joining the group (i.e., UE-1) is i) located out of network coverage, ii) not served by an eNodeB, or iii) served by the relay UE Information indicating that the UE for joining the group (i.e., UE-1) is located in E-UTRAN coverage Information indicating that the UE for joining the group (i.e., UE-1) is located out of a group communication service range Identification information (e.g., ID information, IP address information) of the UE serving as a relay UE Alternatively, unlike the above description, the UE for providing relay service (i.e., UE-2) may include location information (e.g., TAI and/or ECGI) thereof when a message for joining the group is transmitted to the network, but may not include the location information thereof when a message for allowing the relayed UE (i.e., UE-1) to join the group is transmitted to the network, thereby implicitly announcing that the relayed UE participates in group communication via the relay UE.

3-b) Case in which the relay UE (i.e., UE-2) having received the join request message from the relayed UE (i.e., UE-1) has not yet joined the group (e.g., Group#):

3-b-1) If the relayed UE (i.e., UE-1) does not need to be explicitly allowed to join the group, and if information indicating that relay operation should be performed needs to be signaled to the group (e.g., network/group communication system/AS/dispatcher) or permission needs to be received from the group in relation to the relay operation, the relay UE performs i) an operation for joining the group/ii) an operation for transmitting a message including relay operation information. The above 2 operations (i.e., i and ii) may be performed simultaneously, in combination, or separately (i.e., independently). After that, the relay UE transmits a response message to the join request message to the relayed UE. Unlike this, the operation for joining the group/the operation for transmitting the message including the relay operation information may be performed after the response message to the join request message is transmitted.

If the information indicating that the relay operation should be performed does not need to be signaled to the group (e.g., network/group communication system/AS/dispatcher) or permission does not need to be received from the group in relation to the relay operation, the relay UE performs the operation for joining the group. After that, the relay UE transmits the response message to the join request message to the relayed UE.

3-b-2) If the relayed UE (i.e., UE-1) should be explicitly allowed to join or should explicitly join the group, and if the information indicating that the relay operation should be performed needs to be signaled to the group (e.g., network/group communication system/AS/dispatcher) or permission needs to be received from the group in relation to the relay operation, the relay UE performs i) an operation for joining the group/ii) an operation for allowing the relayed UE to join the group/iii) an operation for transmitting a message including relay operation information. The above 3 operations (i.e., i, ii, and iii) may be performed simultaneously, in combination, or separately (i.e., independently). After that, the relay UE transmits the response message to the join request message to the relayed UE. Unlike this, the operation for joining the group/the operation for allowing the relayed UE to join the group/the operation for transmitting the message including the relay operation information may be performed after the response message to the join request message is transmitted.

However, if the relayed UE (i.e., UE-1) should be explicitly allowed to join or should explicitly join the group, but if the information indicating that the relay operation should be performed does not need to be signaled to the group (e.g., network/group communication system/AS/dispatcher) or permission does not need to be received from the group in relation to the relay operation, the relay UE performs i) an operation for joining the group/ii) an operation for allowing the relayed UE to join the group. The above 2 operations (i.e., i and ii) may be performed simultaneously, in combination, or separately. After that, the relay UE transmits the response message to the join request message to the relayed UE. Unlike this, the operation for joining the group/the operation for allowing the relayed UE to join the group may be performed after the response message to the join request message is transmitted.

As the relayed UE (i.e., UE-1) joins the relay UE (i.e., UE-2) as described above, at least one of i) mutual authentication, ii) exchange of information required for group communication, iii) forming of a security relationship for group communication (e.g., security key exchange), and iv) storing of information/context about the opposite UE may be completed/performed.

In addition, messages exchanged between the relay UE and the network, e.g., i) the message transmitted and received when the relay UE joins the group, ii) the message transmitted and received to allow the relayed UE to join the group, and iii) the message including the relay operation information, may go via at least one of a RAN node (e.g., eNodeB), a core network node (e.g., MME, S-GW, P-GW, ProSe-associated node/server, group communication system, and/or an application server for group communication), and a dispatcher. Furthermore, the messages exchanged between the relay UE and the network may use legacy messages or newly defined messages. For example, legacy AS/RRC and NAS messages may be used, newly defined AS/RRC and NAS messages may be used, or new protocol messages may be defined and used.

2. Operation for Providing Relay Service to Relayed UE by Relay UE

If none of the relay UE and the relayed UE is a talking party, the relay UE delivers media/group call/group communication received from the network (or group), to the relayed UE. In this case, the relay UE may also deliver identifier information of the talking party.

If the relay UE is the talking party, the relay UE delivers media/group call/group communication generated thereby, to the relayed UE. In this case, the relay UE may also deliver identifier information thereof as the identifier information of the talking party. In addition, the relay UE may transmit the media/group call/group communication generated thereby to the network (or group).

Otherwise, if the relayed UE is the talking party, the relay UE may deliver media/group call/group communication transmitted from the relayed UE, to the network (or group). In this case, the relay UE may also deliver identifier information of the relayed UE as the identifier information of the talking party, and may additionally provide the identifier information of the relay UE.

Furthermore, to allow the relayed UE to be the talking party, transmit permission may need to be explicitly or implicitly received from the network. In this case, the relay UE may perform an operation for receiving transmit permission for the relayed UE, and this operation may be performed similarly to the above-described operation for allowing the relayed UE to join the group by the relay UE.

3. Operation for Reselecting Relay UE

If the relay UE is or has a chance to be no longer capable of providing relay service to the relayed UE (e.g., if the relay UE and the relayed UE move apart from each other or if the relay UE also moves out of a group communication service range), the relay UE needs to be reselected. This operation includes a combination of one or more of operations described below.

1) The relayed UE detects/determines that the relay UE should be reselected, and discovers/joins i) another UE belonging to the same group or ii) a UE capable of relaying group communication of a group for which the relayed UE desires to receive relay service.

After that, the relayed UE may additionally perform a leave request operation on the old relay UE (i.e., the relay UE having previously provided relay service but no longer capable of providing relay service). However, although the leave request operation is not explicitly performed, leave operation may be performed implicitly. Here, the leave operation means that the relayed UE leaves the old relay UE and does not mean that the relayed UE leaves the group.

2) The relay UE detects/determines that the relay UE is no longer capable of performing relay operation for the relayed UE. Accordingly, the relay UE performs at least one of i) an operation for selecting and delegating the role of the relay UE to another relay UE, and ii) an operation for notifying the relayed UE of related information. Here, the related information notified to the relayed UE includes information about delegation if the role is delegated to another relay UE, or includes only information indicating that the relay UE (i.e., old relay UE) is no longer capable of performing relay operation if the role is not delegated to another relay UE.

3) The network detects/determines that the relay UE should be reselected for the relayed UE. The network performs at least one of i) an operation for selecting and delegating the role of the relay UE to another relay UE, and ii) an operation for notifying the relayed UE of related information. Here, the related information notified to the relayed UE includes information about delegation if the role is delegated to another relay UE, or includes only information indicating that the old relay UE is no longer capable of performing relay operation if the role is not delegated to another relay UE.

In the above operations 2) and 3), an operation for delivering the information/context about the relayed UE, which is stored in the old relay UE, to the new relay UE may be additionally performed. Furthermore, for operation 3), the network may have information about the relayed UE and the relay UE.

4-1. Operation for Utilizing Primary Relay UE and Secondary Relay UE by Relayed UE When a UE located out of a group communication service range (hereinafter referred to as UE-1) initially selects or reselects a relay UE, if two or more relay UE candidates are detected, two relay UEs may be selected. Here, one of the two selected relay UEs serves as a primary relay UE, and the other relay UE serves as a secondary relay UE.

If a relayed UE desires to receive relay service for a plurality of groups (e.g., Group#1 and Group#2), and if a relay UE selectable as a primary relay UE can provide relay service for the 2 groups and the other relay UEs can provide relay service only for parts of the groups, the relayed UE may select/designate a primary relay UE and a secondary relay UE, or may select/designate only secondary relay UEs. For example, if UE-C provides relay service only for Group#1 and UE-D provides relay service only for Group#2, the relayed UE may select/designate UE-C and UE-D as secondary relay UEs.

In this case, information about the plurality of secondary relay UEs may be stored in the form of ordering based on various information items stored in the relayed UE. Examples of the information stored in the relayed UE to order the secondary relay UEs include i) significance levels/priorities of groups for which the relayed UE desires to receive relay service, ii) membership levels of the relayed UE/user in the groups for which the relayed UE desires to receive relay service, iii) information indicating whether group communication is ongoing in a corresponding group at a relay UE selection timing, and iv) information indicating whether the relayed UE is a talking party at the relay UE selection timing.

The relayed UE (i.e., UE-1) may select the primary relay UE and the secondary relay UE, and then perform one of operations described below. The relayed UE may simultaneously select the primary relay UE and the secondary relay UE and then perform the following operation, or may select one relay UE to perform the operation with the selected UE and then additionally select another UE to perform the operation with the selected UE.

1) Operation for Joining Both the Primary Relay UE and the Secondary Relay UE:

The relayed UE (i.e., UE-1) may transmit a join request message to the primary relay UE to explicitly or implicitly request to serve as a primary relay UE. Furthermore, the relayed UE may provide information about the secondary relay UE to the primary relay UE. The primary relay UE performs the above-described operation as the relay UE in the operation for allowing the relayed UE to join the group by the relay UE. In this case, the primary relay UE may include information indicating that the UE itself is the primary relay UE, in a message to be transmitted to the network. Furthermore, the primary relay UE performs the above-described operation as the relay UE in relation to the operation for providing relay service to the relayed UE by the relay UE.

In addition, the relayed UE (i.e., UE-1) may transmit a join request message to the secondary relay UE to explicitly or implicitly request to serve as a secondary relay UE. Furthermore, the relayed UE (i.e., UE-1) may provide information about the primary relay UE. The secondary relay UE may or may not perform the above-described operation as the relay UE in relation to the operation for allowing the relayed UE to join the group by the relay UE. If the secondary relay UE performs the above-described operation in relation to the operation for allowing the relayed UE to join the group by the relay UE, the secondary relay UE may include information indicating that the UE itself is the secondary relay UE, in a message to be transmitted to the network.

2) Operation for Joining Only the Primary Relay UE:

Operation for joining the primary relay UE by the relayed UE (i.e., UE-1) and operation performed by the primary relay UE follow the above-described operation 1). In this case, the relayed UE (i.e., UE-1) may only form the relationship of the relay UE and the relayed UE without joining the secondary relay UE. In this case, various information items required to form the relationship of the relay UE and the relayed UE, which include information about the primary relay UE, may be exchanged therebetween.

Furthermore, interaction operation of the primary relay UE and the secondary relay UE may be additionally performed.

4-2. Operation for Reselecting One of Primary Relay UE and Secondary Relay UE

If the primary relay UE or the secondary relay UE is or has a chance to be no longer capable of providing relay service to the relayed UE (e.g., if the relay UE and the relayed UE move apart from each other or if the relay UE also moves out of a group communication service range), the relay UE needs to be reselected. This operation includes a combination of one or more of operations described below.

1) The relayed UE detects/determines that the primary relay UE should be reselected, and discovers another UE belonging to the same group or a UE capable of relaying group communication of a group for which the relayed UE desires to receive relay service, thereby selecting the discovered UE as the primary relay UE. Alternatively, the relayed UE switches the secondary relay UE (one selected secondary relay UE if a plurality of secondary relay UEs are present) to the primary relay UE, and discovers another UE belonging to the same group or a UE capable of relaying group communication of a group for which the relayed UE desires to receive relay service, thereby selecting the discovered UE as the secondary relay UE.

2) The relayed UE detects/determines that the secondary relay UE should be reselected, and i) discovers another UE belonging to the same group or a UE capable of relaying group communication of a group for which the relayed UE desires to receive relay service, thereby selecting the discovered UE as the secondary relay UE, or ii) discovers another UE belonging to the same group or a UE capable of relaying group communication of a group for which the relayed UE desires to receive relay service, thereby selecting the discovered UE as the primary relay UE, and switches the old primary relay UE to the secondary relay UE.

3) The primary relay UE may detect/determine that the primary relay UE is no longer capable of performing relay operation for the relayed UE, and perform at least one of i) an operation for selecting and delegating the role of the primary relay UE to another relay UE, and ii) an operation for notifying the relayed UE of related information. Here, the related information notified to the relayed UE includes information about delegation if the role is delegated to another relay UE, or includes only information indicating that the primary relay UE is no longer capable of performing relay operation if the role is not delegated to another relay UE. In addition, after the information is received, the relayed UE may perform the operation for selecting the primary relay UE.

Alternatively, the primary relay UE may perform at least one of i) an operation for delegating the role of the primary relay UE to the secondary relay UE (one selected secondary relay UE if a plurality of secondary relay UEs are present), and ii) an operation for notifying the relayed UE of related information (including information about delegation if the role is delegated to the secondary relay UE, or including only information indicating that the primary relay UE is no longer capable of performing relay operation if the role is not delegated to the secondary relay UE). After the information is received, the relayed UE may additionally perform the operation for selecting the secondary relay UE.

4) The secondary relay UE may detect/determine that the secondary relay UE is no longer capable of performing relay operation for the relayed UE, and perform at least one of i) an operation for selecting and delegating the role of the secondary relay UE to another relay UE, and ii) an operation for notifying the relayed UE of related information (including information about delegation if the role is delegated to another relay UE, or including only information indicating that the secondary relay UE is no longer capable of performing relay operation if the role is not delegated to another relay UE). After the information is received, the relayed UE may perform the operation for selecting the secondary relay UE.

5) The network may detect/determine that the primary relay UE should be reselected for the relayed UE, and perform at least one of i) an operation for selecting and delegating the role of the primary relay UE to another relay UE, and ii) an operation for notifying the relayed UE of related information (including information about delegation if the role is delegated to another relay UE, or including only information indicating that the primary relay UE is no longer capable of performing relay operation if the role is not delegated to another relay UE). After the information is received, the relayed UE may perform the operation for selecting the primary relay UE.

Alternatively, the network may perform at least one of i) an operation for delegating the role of the primary relay UE to the secondary relay UE (one selected secondary relay UE if a plurality of secondary relay UEs are present), and ii) an operation for notifying the relayed UE of related information (including information about delegation if the role is delegated to the secondary relay UE, or including only information indicating that the primary relay UE is no longer capable of performing relay operation if the role is not delegated to the secondary relay UE). After the information is received, the relayed UE may additionally perform the operation for selecting the secondary relay UE.

6) The network may detect/determine that the secondary relay UE should be reselected for the relayed UE, and perform at least one of i) an operation for selecting and delegating the role of the secondary relay UE to another relay UE, and ii) an operation for notifying the relayed UE of related information (including information about delegation if the role is delegated to another relay UE, or including only information indicating that the secondary relay UE is no longer capable of performing relay operation if the role is not delegated to another relay UE). After the information is received, the relayed UE may perform the operation for selecting the secondary relay UE.

For the above-described operations 5) and 6), the network may have information about the relayed UE, the primary relay UE, and the secondary relay UE.

When the secondary relay UE is switched to the primary relay UE in the above description, if the relayed UE performs the above-described operation for joining both the primary relay UE and the secondary relay UE, the secondary relay UE may serve as the primary relay UE immediately after the secondary relay UE detects/determines that the secondary relay UE is switched to the primary relay UE.

Furthermore, the switched relay UE (from the secondary relay UE to the primary relay UE) may detect/determine the switching by explicitly receiving a request to start the role of the primary relay UE (e.g., to relay media if group communication is ongoing) from the relayed UE, or without any explicit request.

When the secondary relay UE is switched to the primary relay UE in the above description, if the relayed UE performs the above-described operation for joining only the primary relay UE, the relay UE may serve as the primary relay UE after receiving a request to start the role of the primary relay UE from the relayed UE.

Furthermore, if the relayed UE utilizes the primary relay UE and the secondary relay UE and performs the operation for joining both the primary relay UE and the secondary relay UE or the operation for joining only the primary relay UE, the relayed UE may select/determine/switch the primary and secondary relay UEs between two relay UEs based on, for example, i) information about a group(s) for which the relay UE can provide relay service, ii) signal intensity, iii) preference, and iv) configuration/policy.

In addition, the relayed UE may determine whether to select/utilize only one relay UE or two relay UEs, based on various information items described below. However, such information items are merely listed for convenience of explanation below, and should not be construed as being limited thereto.

The number of relay UE candidates

Signal intensities with the relay UE candidates

Information indicating whether group communication is ongoing at a relay UE selection timing Information indicating whether the relayed UE is a talking party at the relay UE selection timing Policy/configuration Battery charge information of the relayed UE Location information of the relayed UE Information about a group(s) for which the relay UE can provide relay service History information when the relayed UE is located in E-UTRAN coverage, e.g., information about a PLMN for the latest service, information indicating whether the PLMN is a roaming network, etc.

5. Operation of Group Communication Application Server (AS)

5-1) The group communication AS may determine whether to deliver downlink media/traffic for a specific group using a multicast (i.e., MBMS) scheme based on i) the number of members belonging to the group within a cell or ii) the number of UEs/users participating in group communication of the group.

For example, the group communication AS may determine to use MBMS if the number is equal to or greater than, or satisfies a certain reference value. In this case, the group communication AS excludes (i.e., does not count) UEs which receive relay service (via relay UEs) when counting the number of members belonging to the group within the cell. As such, inappropriate determination to use MBMS by counting UEs participating in group communication via relay UEs (i.e., UEs not capable of receiving MBMS media/traffic) even when the actual number of UEs located within coverage of the cell and capable of receiving MBMS media/traffic while being served by an eNodeB is less than the reference value may be prevented.

Although whether to use MBMS is determined on a cell basis in the above description, the determination can be made based on various granularities. Examples thereof may include a group communication service area, an MBMS service area, a tracking area, multiple tracking areas, a single cell, multiple cells, a Multimedia Broadcast multicast service Single Frequency Network (MBSFN) area, an area split/divided for group communication, and a PLMN.

5-2) When the group communication AS should transmit MBMS service information/information related to MBMS service/MBMS user service description (USD) information to UEs joining the group or participating in group communication, the group communication AS does not transmit the information to UEs participating in group communication via relay UEs. In this case, when the group communication AS should transmit MBMS service information, the group communication AS may transmit the MBMS service information to the relay UEs. The MBMS service information should be transmitted to UEs, for example, i) if the MBMS service information should be transmitted to all UEs joining a specific group to deliver downlink media/traffic to the group using an MBMS scheme, ii) if a new UE joins a group having already delivered downlink media/traffic using an MBMS scheme, and iii) if the content of the MBMS service information is changed.

Furthermore, the above-described MBMS service information includes various information items required by a UE to receive MBMS media/traffic, e.g., a service identifier (ID), a temporary mobile group identity (TMGI), and media information including a multicast address/port of media.

In the above-described operations 5-1) and 5-2), the group communication AS determines whether a UE joining the group participates in group communication via a relay UE, based on one or more information items described below.

A message for joining the group is received from the UE and this message includes relay operation information. Information corresponding to the relay operation information follows the description given above in relation to the operation for allowing the relayed UE to join the group by the relay UE. In addition, the relay operation information may be included in the message for joining the group by the relay UE or the relayed UE.

A message for joining the group is received from the UE and this message does not include location information of the UE.

Furthermore, if the message for joining the group is received from the UE, the group communication AS may allow the UE to join the group and store information indicating that the UE participates in group communication via a relay UE (i.e., the relay operation information) together with information about the UE/user authenticated to join the group.

Although a description of group communication including UE-to-network relay operation has been given above, the proximity-based group communication method proposed by the present invention may be extended and applied to group communication including UE-to-UE relay operation. Furthermore, the present invention may also be extended and applied to a case in which multiple UEs simultaneously transmit media. In addition, the present invention may be applied to, for example, one-to-one communication and broadcast communication as well as group communication.

Furthermore, the above-described operation for joining the group may be understood as an operation for registering in the group (including a node or function related to group communication, e.g., group communication system/group communication AS/dispatcher) in the present invention.

In addition, the above-described operation for discovering the relay UE by the relayed UE may refer to a discovery operation performed while exchanging messages therebetween, or simply refer to an operation for detecting/discovering the relay UE by the relayed UE in the present invention.

Besides, the above-described application server for group communication, AS, group communication AS, or group communication system may correspond to or include the GCSE AS of FIG. 6 in the present invention.

Furthermore, the present invention is not limited to the LTE/EPC network and may be applied to all UMTS/EPS mobile communication systems including both a 3GPP access network (e.g., UTRAN/GERAN/E-UTRAN) and a non-3GPP access network (e.g., WLAN). In addition, the present invention may also be applied to all other radio mobile communication system environments to which control of a network is applied.

A description is now given of operation according to an embodiment of the present invention based on the above descriptions.

Figure 7:
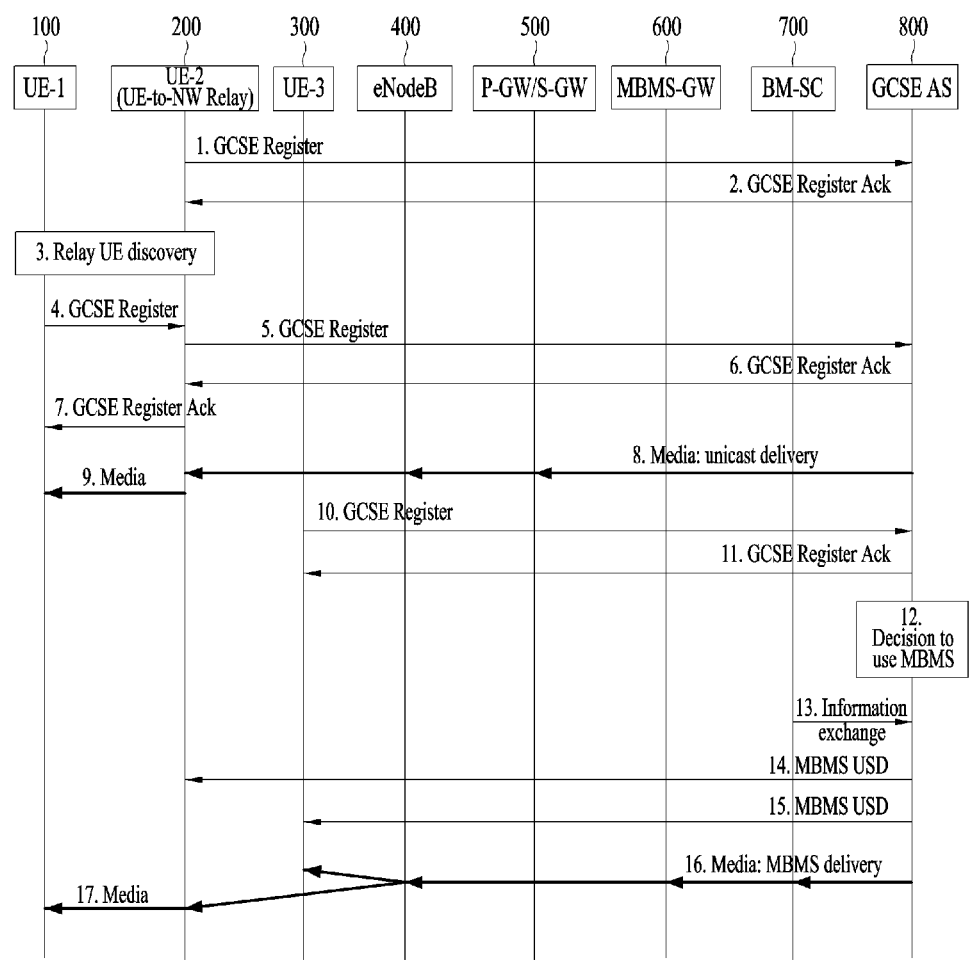
FIG. 7 is a view for describing group communication according to an embodiment of the present invention.

FIG. 7 illustrates group communication according to an embodiment of the present invention. FIG. 7 assumes that UE-1 100, UE-2 200, and UE-3 300 are members of Group#1 and the UE-1 100 is not capable of participating in group communication of Group#1 via the network and thus participates in group communication of Group#1 via a UE-to-network relay (i.e., UE-2).

In step 1 of FIG. 7, the UE-2 200 transmits a message for joining/registering in a group to participate in group communication of Group#1, i.e., a GCSE Register message, to a GCSE AS 800. As such, in step 2 of FIG. 7, the GCSE AS 800 transmits a response message to the GCSE Register message received from the UE-2 200, i.e., a GCSE Register Ack message, to the UE-2 200.

In step 3 of FIG. 7, the UE-1 100 detects or discovers a UE-to-network relay to participate in group communication of Group#1. As a result, the UE-2 200 is determined to relay the group communication. A detailed description of the method for discovering/determining a relay UE has been given above in relation to ProSe-based group communication according to the present invention, and thus is omitted here to avoid redundancy.

In step 4 of FIG. 7, the UE-1 100 transmits a message for joining/registering in a group to participate in group communication of Group#, i.e., a GCSE Register message, to the UE-2 200. (Alternatively, this message is ultimately transmitted to the GCSE AS 800, and thus may be understood as being transmitted to the GCSE AS 800.)

In step 5 of FIG. 7, the UE-2 200 transmits the GCSE Register message received from the UE-1 100, to the GCSE AS 800. In this case, the UE-2 200 may include relay operation information in the GCSE Register message. Alternatively, the relay operation information may be included by the UE-1 100 in step 4. A detailed description of the relay operation information has been given above in relation to ProSe-based group communication according to the present invention, and thus is omitted here to avoid redundancy.

In step 6 of FIG. 7, the GCSE AS 800 having received the GCSE Register message detects that the UE-1 100 desires to participate in group communication of Group#1 via a relay UE. The GCSE AS 800 transmits a response message to the GCSE Register message received from the UE-1 100, i.e., a GCSE Register Ack message, to the UE-2 200. (Alternatively, this message is ultimately transmitted to the UE-1 100, and thus may be understood as being transmitted to the UE-1 100.)

In step 7 of FIG. 7, the UE-2 200 transmits the GCSE Register Ack message received from the GCSE AS 800, to the UE-1 100.

In step 8 of FIG. 7, group communication of Group#1 is started and it is assumed that the GCSE AS 800 determines to transmit downlink media/traffic using a unicast scheme. As such, the GCSE AS 800 transmits downlink media/traffic using a unicast scheme to the UE-2 200. For example, the GCSE AS 800 determines to transmit downlink media/traffic using a unicast scheme because the number of all UEs participating in group communication of Group#1 and camped on a cell on which the UE-2 200 is camped is still insufficient to use an MBMS scheme (i.e., less than a reference value). When the number of UEs is counted, a UE participating in group communication via a relay UE (i.e., UE-1) is not counted or considered.

In step 9 of FIG. 7, the UE-2 200 having received the downlink media/traffic for Group#1 from the network transmits the media/traffic to the UE-1 100 through ProSe communication.

In step 10 of FIG. 7, the UE-3 300 transmits a message for joining/registering in a group to participate in group communication of Group#1, i.e., a GCSE Register message, to the GCSE AS 800. It is assumed that the UE-3 300 is camped on the same cell as the UE-2 200.

In step 11 of FIG. 7, the GCSE AS 800 transmits a response message to the GCSE Register message received from the UE-3 300, i.e., a GCSE Register Ack message, to the UE-3 300.

In step 12 of FIG. 7, the GCSE AS 800 determines to transmit downlink media/traffic using an MBMS scheme for the cell in which the UE-2 200 and the UE-3 300 are located. For example, the GCSE AS 800 determines to transmit downlink media/traffic using an MBMS scheme because the number of all UEs participating in group communication of Group#1 and camped on the cell on which the UE-2 200 and the UE-3 300 are camped satisfies the reference value for determining to use MBMS. When the number of UEs is counted, a UE participating in group communication via a relay UE (i.e., the UE-1 100 in FIG. 7) is not counted or considered.

In steps 13, 14, and 15 of FIG. 7, the GCSE AS 800 acquires USD information for MBMS delivery from a BM-SC 700, and transmits the MBMS USD information corresponding to MBMS service information to the UE-2 200 and the UE-3 300. For reference, the GCSE AS 800 does not transmit the MBMS USD information to the UE-1 100 because the GCSE AS 800 knows that the UE-1 100 participates in group communication via a relay UE.

In step 16 of FIG. 7, the GCSE AS 800 transmits downlink media/traffic using an MBMS scheme. The UE-2 200 and the UE-3 300 receive the downlink media/traffic based on the MBMS USD information acquired in steps 14 and 15.

In step 17 of FIG. 7, the UE-2 200 having received the downlink media/traffic for Group#1 from the network transmits the media/traffic to the UE-1 100 through ProSe communication.

In addition, although step 12 of FIG. 7 assumes that group communication is ongoing (i.e., group communication has already been started in step 8), group communication may be started in step 12.

Furthermore, FIG. 7 assumes that the UE-2 200 is a member of Group#1 corresponding to group communication in which the UE-1 100 participates. However, even when the UE-2 200 is not a member of Group#1, the UE-2 200 may relay group communication of Group#1 for the UE-1 100. In this case, steps 1 and 2 of FIG. 7 are not necessary.

Figure 8:
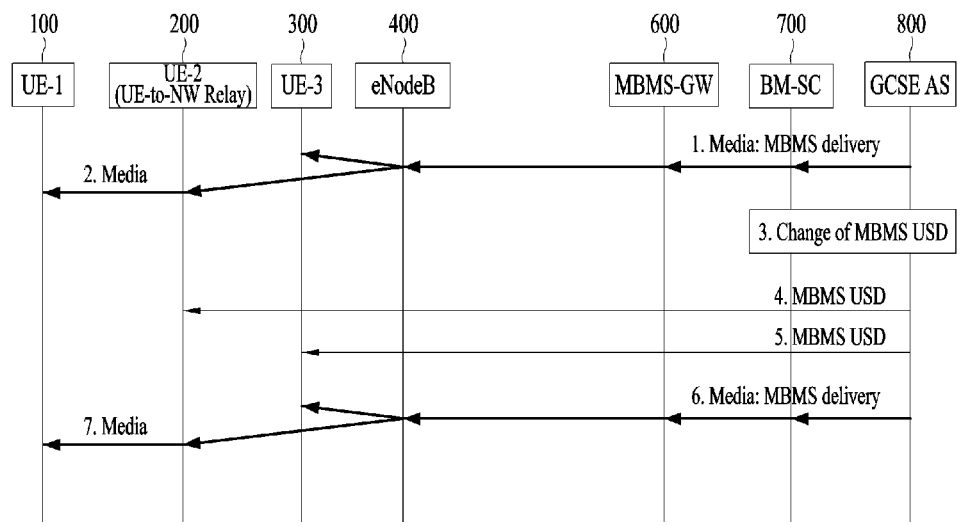
FIG. 8 is a view for describing group communication according to another embodiment of the present invention.

FIG. 8 illustrates group communication according to another embodiment of the present invention. FIG. 8 assumes that the UE-1 100, the UE-2 200, and the UE-3 300 are members of Group#1 and the UE-1 100 is not capable of participating in group communication of Group#1 via the network and thus participates in group communication of Group#1 via a UE-to-network relay (i.e., the UE-2 200).

In step 1 of FIG. 8, it is assumed that group communication of Group#1 is ongoing. The GCSE AS 800 transmits downlink media/traffic using an MBMS scheme. As such, the UE-2 200 and the UE-3 300 receive the downlink media/traffic based on already acquired MBMS USD information.

In step 2 of FIG. 8, the UE-2 200 having received the downlink media/traffic for Group#1 from the network transmits the media/traffic to the UE-1 100 through ProSe communication.

In step 3 of FIG. 8, MBMS service information is changed. This means that one or more information items included in the MBMS service information are changed/updated. As such, the GCSE AS 800 determines to transmit the MBMS USD information corresponding to the MBMS service information to UEs participating in group communication. An example in which the MBMS service information is changed includes a case in which, as QoS related to an MBMS bearer is changed, a new TMGI is allocated instead of an old TMGI and thus group communication is performed via an MBMS bearer to which the changed QoS is applied.

In steps 4 and 5 of FIG. 8, the GCSE AS 800 transmits the MBMS USD information corresponding to the MBMS service information to the UE-2 200 and the UE-3 300. Here, the GCSE AS 800 does not transmit the MBMS USD information to the UE-1 100 because the GCSE AS 800 knows that the UE-1 100 participates in group communication via a relay UE.

In step 6 of FIG. 8, the GCSE AS 800 transmits downlink media/traffic using an MBMS scheme. As such, the UE-2 200 and the UE-3 300 receives the downlink media/traffic based on the already acquired MBMS USD information.

In step 7 of FIG. 8, the UE-2 200 having received the downlink media/traffic for Group#1 from the network transmits the media/traffic to the UE-1 100 through ProSe communication.

In addition, FIG. 8 assumes that the UE-2 200 is a member of Group#1 corresponding to group communication in which the UE-1 100 participates. However, even when the UE-2 200 is not a member of Group#1, the UE-2 200 may relay group communication of Group#1 for the UE-1 100.

The above-described embodiments of the present invention may be applied independently or two or more embodiments may be applied simultaneously.

Figure 9:
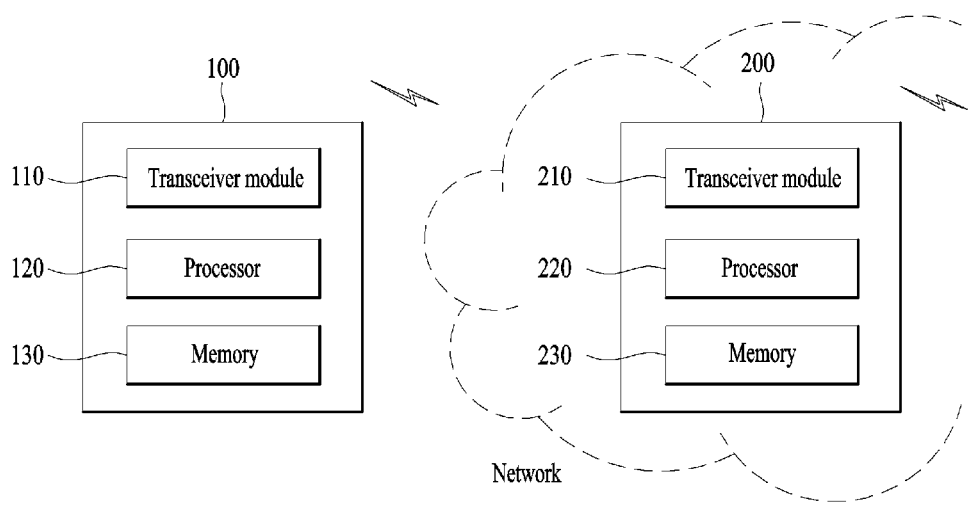
FIG. 9 is a view illustrating the configurations of a UE and a network node according to an embodiment of the present invention.

FIG. 9 is a view illustrating the configurations of a UE 100 and a network node 200 according to an embodiment of the present invention.

Referring to FIG. 9, the UE 100 according to the present invention may include a transceiver module 110, a processor 120, and a memory 130. The transceiver module 110 may be configured to transmit and receive various types of signals, data and information to and from an external device. The UE 100 may be connected to the external device by wire and/or wirelessly. The processor 120 may be configured to provide overall control to the UE 100, and to process information to be transmitted to or received from the external device by the UE 100. The memory 130 may store the processed information for a certain period of time and may be replaced by an element such as a buffer (not shown).

The UE 100 according to an embodiment of the present invention may be configured to participate in ProSe based on a result of determining whether ProSe started by a network is enabled or whether a ProSe UE is discovered. The processor 120 of the UE 100 may be configured to transmit ProSe-based information to the network node 200 using the transceiver module 110. The processor 120 may be configured to receive ProSe permission information from the network node 200 using the transceiver module 110. The processor 120 may be configured to process signals for setting up a direct data path with another UE. The processor 120 may be configured to perform direct communication with the other UE using the transceiver module 110. The processor 120 may be configured to transmit ProSe result information to the network node 200 using the transceiver module 110.

Referring to FIG. 9, the network node 200 according to the present invention may include a transceiver module 210, a processor 220, and a memory 230. The transceiver module 210 may be configured to transmit and receive various types of signals, data and information to and from an external device. The network node 200 may be connected to the external device by wire and/or wirelessly. The processor 220 may be configured to provide overall control to the network node 200, and to process information to be transmitted to or received from the external device by the network node 200. The memory 230 may store the processed information for a certain period of time and may be replaced by an element such as a buffer (not shown).

The network node 200 according to an embodiment of the present invention may be configured to support ProSe among a plurality of UEs. The processor 220 of the network node 200 may be configured to receive ProSe-based information from the UE 100 or another network node using the transceiver module 210. The processor 220 may be configured to transmit ProSe permission information to the UE 100 using the transceiver module 210. The processor 220 may be configured to process signals supporting the UE 100 to set up a direct data path with another UE. The processor 220 may be configured to receive ProSe result information from the UE 100 using the transceiver module 210.

In addition, for the detailed configurations of the UE 100 and the network node 200, the above-described embodiments of the present invention may be applied independently or two or more embodiments may be applied simultaneously, and repeated descriptions are omitted for clarity.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. Software code may be stored in a memory unit and executed by a processor. The memory unit may be located inside or outside the processor and exchange data with the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

The invention claimed is:

1. A method for performing a group communication based on proximity services (ProSe) by a relay user equipment (UE) for performing a relay operation for a relayed UE communicating with a network node via the relay UE in a wireless communication system, the method comprising:
    transmitting, to the network node, a first group communication registration message for the relay UE, including location information of the relay UE, to join the group communication and a second group communication registration message for the relayed UE, received from the relayed UE, to join the group communication;
    receiving, from the network node, a downlink signal based on a group communication scheme,
    wherein the group communication scheme is determined to be a multimedia broadcast and multimedia service (MBMS) scheme if a number of UEs other than the relayed UE among UEs registered in the network node for the group communication is equal to or greater than a reference value, and the group communication scheme is determined to be a unicast scheme if the number of the UEs other than the relayed UE is smaller than the reference value, and
    wherein the relayed UE is implicitly announced to the network node by transmitting the second group communication registration message not including location information for the relayed UE; and
    transmitting, to the relayed UE, the downlink signal received from the network node.

2. The method according to claim 1, wherein the location information includes at least one of a tracking area identity (TAI) and an evolved universal mobile telecommunications services (UMTS) terrestrial radio access network (E-UTRAN) cell global identifier (ECGI).

3. The method according to claim 1, further comprising receiving MBMS service information from the network node.

4. The method according to claim 3, wherein the MBMS service information is configured to be transmitted only to at least one relay UE among the at least one relay UE and at least one relayed UE located in a service range of the group communication.

5. The method according to claim 3, wherein the MBMS service information includes at least one of a service identifier (ID), a temporary mobile group identity (TMGI), and a multicast address of media.

6. The method according to claim 1, wherein granularity for a service range of the group communication is one of a single cell, a group communication service area, an MBMS service area, a single tracking area, multiple tracking areas, multiple cells, a Multimedia Broadcast multicast service Single Frequency Network (MBSFN) area, an area pre-specified for group communication, and a Public Land Mobile Network (PLMN).

7. The method according to claim 1, further comprising:
    receiving, from the network node, a response to the first group communication registration message and a response to the second group communication registration message;
    transmitting, to the relayed UE, the response to the second group communication registration message; and
    transmitting, to the relayed UE, the downlink signal from the network node through ProSe communication, if the response to the second group communication registration message is an acknowledgement.

8. The method according to claim 7, wherein the response to the second group communication registration message includes the location information of the relay UE.

9. The method according to claim 8, wherein the response to the second group communication registration message includes relay operation information, and
    wherein the relay operation information indicates at least one of:
    whether the relay UE performs relay operation for the relayed UE,
    whether the relayed UE is registered to join the group communication via the relay UE,
    whether the relayed UE participates in the group communication via the relay UE,
    whether the relayed UE is located in network coverage,
    whether the relayed UE is located in evolved universal mobile telecommunications services (UMTS) terrestrial radio access network (E-UTRAN) coverage supporting the group communication, and
    whether the relayed UE is located in a service range of the group communication.

10. The method according to claim 8, wherein the response to the second group communication registration message includes identification information of the relay UE.

11. A relay user equipment (UE) for performing a relay operation for a relayed UE communicating with a network node via the relay UE and performing a group communication based on proximity services (ProSe) in a wireless communication system, the relay UE comprising:
    a transceiver; and
    a processor,
    wherein the processor:
        transmits, through the transceiver to the network node, a first group communication registration message for the relay UE, including location information of the relay UE, to join the group communication and a second group communication registration message for the relayed UE, received from the relayed UE, to join the group communication, receives, through the transceiver from the network node, a downlink signal based on a group communication scheme, wherein the group communication scheme is determined to be a multimedia broadcast and multimedia service (MBMS) scheme if a number of UEs other than relayed UE among UEs registered in the network node for the group communication is equal to or greater than a reference value, and the group communication scheme is determined to be a unicast scheme if the number of the UEs other than the relayed UE is smaller than the reference value, and wherein the relayed UE is implicitly announced to the network node by transmitting the second group communication registration message not including location information for the relayed UE, and transmits, through the transceiver to the relayed UE, the downlink signal received from the network node.

12. A method for supporting a group communication based on proximity services (ProSe) by a network node in a wireless communication system, the method comprising:

receiving, from a relay User Equipment (UE) for performing a relay operation for a relayed UE communicating with the network node via the relay UE, a first group communication registration message for the relay UE, including location information of the relay UE, to join the group communication and a second group communication registration message for the relayed UE, transmitted from the relayed UE, to join the group communication;

determining a group communication scheme to be a multimedia broadcast and multimedia service (MBMS) scheme if a number of UEs other than the relayed UE among UEs registered in the network node for the group communication is equal to or greater than a reference value, and determining the group communication scheme to be a unicast scheme if the number of the UEs other than the relayed UE is smaller than the reference value, wherein the relayed UE is implicitly announced to the network node by receiving the second group communication registration message not including location information for the relayed UE; and transmitting, to the relay UE, a downlink signal based on the group communication scheme.

* * * * *